US009057463B2

(12) United States Patent
Haddox

(10) Patent No.: US 9,057,463 B2
(45) Date of Patent: Jun. 16, 2015

(54) QUICK DISCONNECT CONNECTOR FOR SUBSEA TUBULAR MEMBERS

(75) Inventor: Cliff T. Haddox, Houston, TX (US)

(73) Assignee: Vetco Gray U.K. Limited, Bridge of Don (GB)

( * ) Notice: Subject to any disclaimer, the term of this patent is extended or adjusted under 35 U.S.C. 154(b) by 533 days.

(21) Appl. No.: 13/430,435

(22) Filed: Mar. 26, 2012

(65) Prior Publication Data
US 2013/0249210 A1 Sep. 26, 2013

(51) Int. Cl.
*F16L 35/00* (2006.01)
*F16L 1/26* (2006.01)
*E21B 33/038* (2006.01)
*E21B 17/08* (2006.01)
*F16L 37/00* (2006.01)
*F16L 37/62* (2006.01)

(52) U.S. Cl.
CPC ............... *F16L 1/26* (2013.01); *E21B 33/038* (2013.01); *E21B 17/085* (2013.01); *F16L 37/002* (2013.01); *F16L 37/62* (2013.01)

(58) Field of Classification Search
CPC ........ E21B 17/085; E21B 33/038; F16L 1/26; F16L 37/62; F16L 37/002
USPC ............. 285/33, 34, 320, 322, 920, 922
See application file for complete search history.

(56) References Cited

U.S. PATENT DOCUMENTS

| 3,028,179 A * | 4/1962 | Abramoska .............. 285/317 |
| 3,419,071 A | 12/1968 | Williams, Jr. et al. |
| 3,732,923 A * | 5/1973 | Fowler ..................... 166/340 |
| 4,411,317 A * | 10/1983 | Gieswein ................. 166/347 |
| 4,632,432 A | 12/1986 | Reneau |
| 4,708,376 A * | 11/1987 | Jennings et al. ........... 285/315 |
| 6,070,659 A | 6/2000 | Radi et al. |
| 7,240,735 B2 | 7/2007 | Crozier |
| 7,705,401 B2 | 4/2010 | Mikasa |

(Continued)

FOREIGN PATENT DOCUMENTS

| GB | 2129894 A | 5/1984 |
| GB | 2197407 A | 5/1988 |
| WO | 2004104365 A1 | 12/2004 |

OTHER PUBLICATIONS

Brochure of "The NT-2 Connection System", ABB Vetco Gray, ABB Oil, Gas & Petrochemicals, copyright 1999,—"The Cutting Edge Technologies others can only follow"—World Class People, Systems & Services.

(Continued)

*Primary Examiner* — Michael P Ferguson
*Assistant Examiner* — Jay R Ripley
(74) *Attorney, Agent, or Firm* — Bracewell & Giuliani LLP

(57) ABSTRACT

A subsea connector includes first and second tubular members, each having a forward end with an external first flange. A guide basket with an open forward end extends around the first tubular member. A fluid cylinder assembly moves the guide basket axially relative to the first tubular member between a rearward position and a forward position. Lock dogs are carried by the second tubular member. Each of the dogs has a first load shoulder and a second load shoulder and is mounted to a dog support. The dog support has a forward portion that contracts and expands radially relative to the second tubular member. While the guide basket is in the forward position, an interior of the guide basket engages outer sides of the dogs to retain the first and second load shoulders of the dogs in engagement with the first and second flanges.

16 Claims, 4 Drawing Sheets

(56) References Cited

U.S. PATENT DOCUMENTS

| | | | |
|---|---|---|---|
| 8,317,234 B2* | 11/2012 | McKay | 285/81 |
| 2004/0007362 A1* | 1/2004 | Rodgers et al. | 166/344 |
| 2010/0047023 A1* | 2/2010 | Horne | 405/184.1 |

OTHER PUBLICATIONS

Search Report dated Aug. 14, 2013 from corresponding Application No. GB1305368.1.

* cited by examiner

QUICK DISCONNECT CONNECTOR FOR SUBSEA TUBULAR MEMBERS

FIELD

This disclosure relates in general to connectors for coupling tubular members, and in particular to connectors employing dogs that latch to external flanges of the tubular members to secured the tubular members in abutment with each other.

BACKGROUND

In subsea oil and gas drilling and production, many instances occur where tubular members must be connected to each other remotely. For example, remote connectors may connect a workover riser to a subsea tree, a flow line jumper to flow lines, or a flow line to subsea equipment.

In some instances, the connector has to be able to quickly release the tubular members from each other, such as in the event of an emergency. Also, it may be that the tubular members become misaligned with each other while still connected. Being able to disconnect quickly from tubular members at angles relative to each other is difficult.

Many types of remote operated subsea connectors have been patented and/or used. One general type has an external flange on the abutting end of each tubular member. Dogs have a load shoulder on each end. An upper load shoulder of each dog rests on the external flange of an upper tubular member as the upper tubular member moves downward toward the lower tubular member. After the upper tubular member abuts the lower tubular member, a cam driven by a hydraulic piston mounted to the upper tubular member slides downward along the outer sides of the dogs, rocking the dogs and pushing the lower load shoulder into locking engagement with the flange of the lower tubular member.

SUMMARY

The subsea connector of this disclosure includes first and second tubular members, each having a forward end with an external flange. A guide basket extends around the first tubular member, the guide basket having an open forward end. A fluid cylinder assembly moves the guide basket axially relative to the first tubular member between a rearward position and a forward position. Lock dogs are carried by the second tubular member, each of the dogs having a first load shoulder and a second load shoulder and being radially movable relative to the second tubular member. While the guide basket is in the forward position, an interior of the guide basket engages outer sides of the dogs to retain the first and second load shoulders of the dogs in engagement with the first and second flanges. Moving the guide basket to the rearward position disengages the interior of the guide basket from the outer sides of the dogs.

Preferably the open forward end of the guide basket is forward of the forward end of the second tubular member while the basket is in the rearward and the forward positions. The interior of the guide basket has a tapered conical surface extending rearward and decreasing in diameter from the open forward end of the basket. In the preferred embodiment, a tapered soft landing shoulder is in the interior of the guide basket forward of a backstop surface.

The dogs having forward ends that initially land on the soft landing shoulder as the second tubular member moves toward the first tubular member. The forward ends of dogs then slide from the soft landing shoulder to the backstop surface as the forward end of the second tubular member abuts the forward end of the first tubular member.

In the preferred embodiment, a lock dog support is positioned around the second tubular member, the support having a rearward end fixed to the second tubular member and axially spaced from the second flange. The dogs are mounted to a forward end of the support and located within the basket when the forward ends of the first and second tubular members are in abutment with each other. The forward portion of the support is radially flexible and has an initial position wherein the first and second load shoulders of the dogs are spaced radially outward from the first and the second flanges, respectively. The support has a locked position wherein the basket is in the forward position, the interior of the basket is in engagement with outer sides of the dogs, and the first and second load shoulders of the dogs are in engagement with the first and the second flanges, respectively.

The support may be made up of a plurality of rods spaced around the second tubular member parallel with the axis, each of the rods being resilient and flexible along a length between the forward and rearward ends of the support. Each of the dogs is secured to a forward end of one of the rods. Preferably, each the dogs is movable in unison with the forward end of the rod to which each of the dogs is attached.

SPECIFICATION

Figure 1:
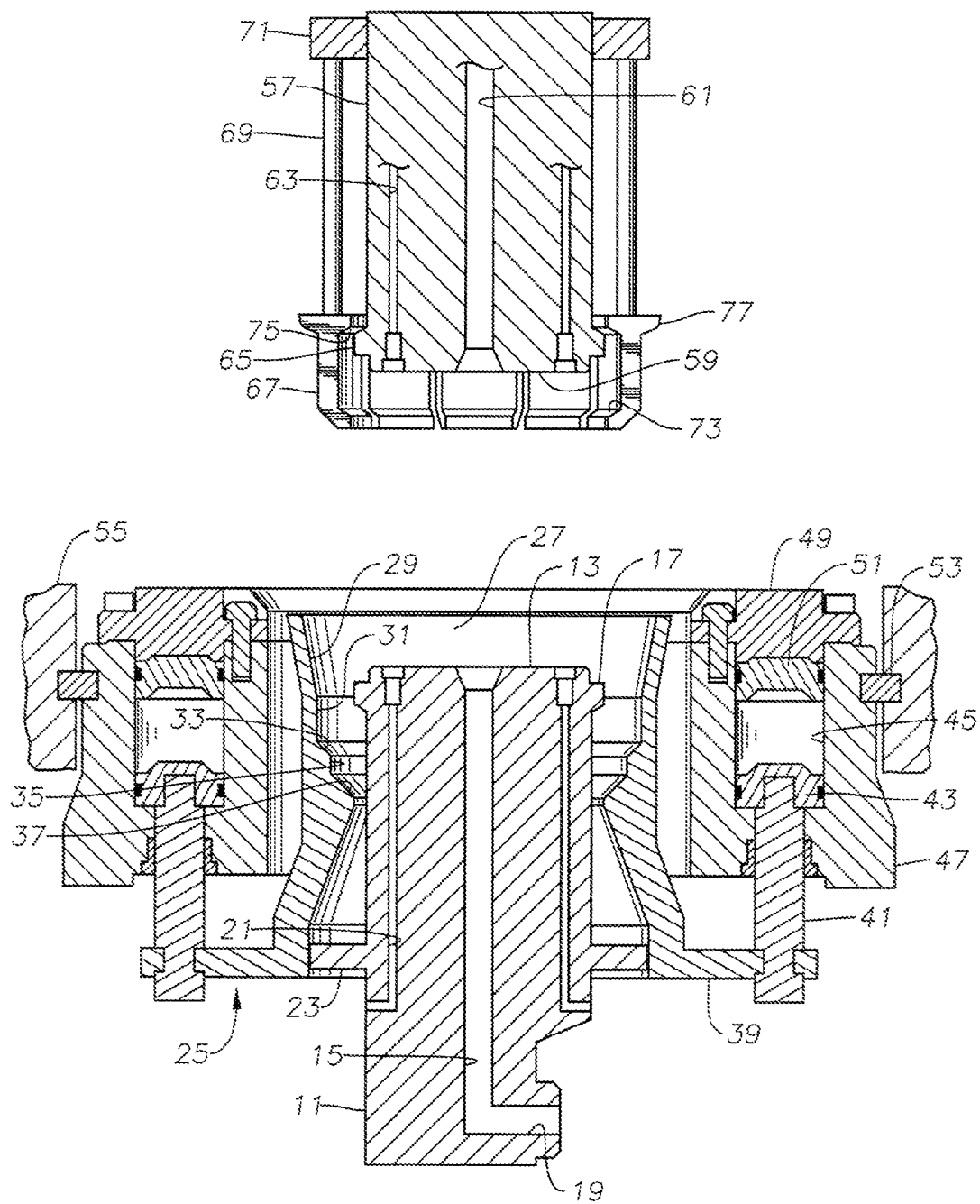
FIG. 1 is a sectional view of first and second tubular members having a connector assembly in accordance with this disclosure and shown prior to abutting each other.

FIG. 1 illustrates as an example a quick disconnect connector assembly for a workover riser of a subsea well. The quick disconnect assembly has a first or lower tubular member that has an upper or forward end 13. Terms such as "upper", "lower", "forward", and "rearward" are used only for convenience as the connector assembly could be oriented in various directions. Upper end 13 may be flat and located in a plane perpendicular to first tubular member 11. One or more flow passages 15 extend through lower tubular member 11. An external first flange 17 is formed on lower tubular member 11 adjacent to upper end 13. First flange 17 extends circumferentially around first tubular member 11.

In this example, flow passage 15 has a rearward or lower end 19 that is at an angle of 90 degrees relative to the upper portion. However, flow passage 15 could alternately extend axially only. The diameter of flow passage 15 relative to the outer diameter of lower tubular member 11 could be much larger, particularly if the assembly in FIG. 1 is used for other purposes, such as a flowline jumper. An array of auxiliary passages 21 optionally may also extend from upper end 13 into first tubular member 11. Auxiliary passages 21 may be used for supplying hydraulic fluid pressure, and would have stab type couplings (not shown) at upper end 13. Optionally a lower flange 23 may be formed on lower tubular member 11 a selected distance from forward end 13.

A guide basket 25 has a rigid side wall extending around first tubular member 11. Guide basket 25 has a circular open forward or upper end 27. Guide basket 25 is illustrated as having a solid side wall; alternately the side wall could be made up of webs or strips of material. The interior of the side wall of guide basket 25 includes a conical surface 29 extending downward from upper end 27. Conical surface 29 decreases in diameter in a downward direction and joins a cylindrical surface 31. Cylindrical surface 31 extends downward and joins a soft landing shoulder 33, which is an annular conical surface. A lower cylindrical surface 35 extends downward from soft landing shoulder 33 and joins a back stop shoulder 37. Back stop shoulder 37 is also a conical surface and may have the same angle of inclination as soft landing shoulder 33. In the embodiment shown, back stop shoulder 37 has a greater width than soft landing shoulder 33. The outer diameter of back stop shoulder 37 is the same as the inner diameter of soft landing shoulder 33.

Guide basket 25 has an open bottom encircled by an external flange 39. A number of piston rods 41 are secured to flange 39 and extend upward to an annular primary piston 43. Piston 43 is located in an annular hydraulic chamber 45, which is formed in a hydraulic cylinder housing 47 that extends around lower tubular member 11. A cap ring 49 mounts on the upper side of housing 47, closing off chamber 45. Optionally an annular secondary piston 51 may be carried in chamber 45 above primary piston 43 for assisting primary piston 43 in applying a disconnect force. In this example, a mounting ring 53 on the exterior of housing 47 secures housing 47 to a stationary structure 53. Preferably lower tubular member 11 and stationary structure 53 are fixed relative to each other. Alternately, housing 47 could be mounted to lower tubular member 11. When supplied with fluid pressure, piston 43 will move guide basket 25 axially relative to lower tubular member 11 from the lower or rearward position shown in FIGS. 1, 6 and 7 to the upper or forward position shown in FIGS. 2 and 3.

A second or upper tubular member 57 has a forward or lower end 59. A flow passage 61 registers with lower tubular member flow passage 15. Auxiliary passages 63 align and couple to auxiliary passages 21 of lower tubular member 11. An external second flange 65 is formed on upper tubular member 57 adjacent lower end 59.

A plurality of lock dogs 67 are carried by and circumferentially spaced around upper tubular member 57. Dogs 67 are mounted to a support member so as to be positioned radially outward from upper tubular member 57 prior to connection with lower tubular member 11. The lower portion of the support member is resilient and capable of being flexed radially inward so as to move dogs 67 radially inward from the initial position of FIG. 1 to the locked position of FIG. 3. In this embodiment, the support member is made up of flexible and resilient support rods 69 spaced circumferentially around upper tubular member 57. Each support rod 69 has an upper end secured to a support ring 71 rigidly mounted to upper tubular member 57. Each dog 67 may be attached to a lower end of one of the rods 69 with a ball-type joint that allows a few degrees of pivotal movement relative to rod 69, such as four or five degrees. Alternately, a ridged connection n is feasible if the stresses are low enough.

As an example, support rods 69 may be solid and formed of carbon fiber. While in the initial position of FIG. 1, support rods 69 are parallel to the longitudinal axis of upper tubular member 57. While in the locked position of FIG. 3, the lower ends of rods 69 are pushed radially inward, placing rods 69 at an angle relative to the longitudinal axis. An elastomeric sleeve could be employed as an alternative to support rods 69.

Each dog 67 has a lower or first load shoulder 73 that protrudes inward and may be a generally upward and inward facing conical surface for engaging the lower side of first flange 17. Each dog 67 has a second or upper load shoulder 75 that protrudes inward and may be a generally downward and inward facing conical surface for engaging the upper side of second flange 65. Each dog 67 also has an outward extending external rib 77 on its upper end opposite from upper load shoulder 75.

In operation, initially, guide basket 25 will be in its lower position shown in FIG. 1. In the lower position, guide basket upper end 27 is below the upper end of housing cap 49 but it may be above lower tubular member upper end 13. Upper tubular member 57 will be lowered on a running string into proximity to lower tubular 11, preferably guided by a remote operated vehicle (ROV). By using markings or some other technique, the ROV will rotate and orient upper tubular member 57 so that auxiliary passages 63 align with auxiliary passages 21. Upper load shoulders 75 of dogs 67 will be above and radially outward from second flange 65. Lower load shoulders 73 of dogs 67 will be below lower end 59 of upper tubular member 57. Rods 69 will be parallel with the axis of upper tubular member 57.

Figure 2:
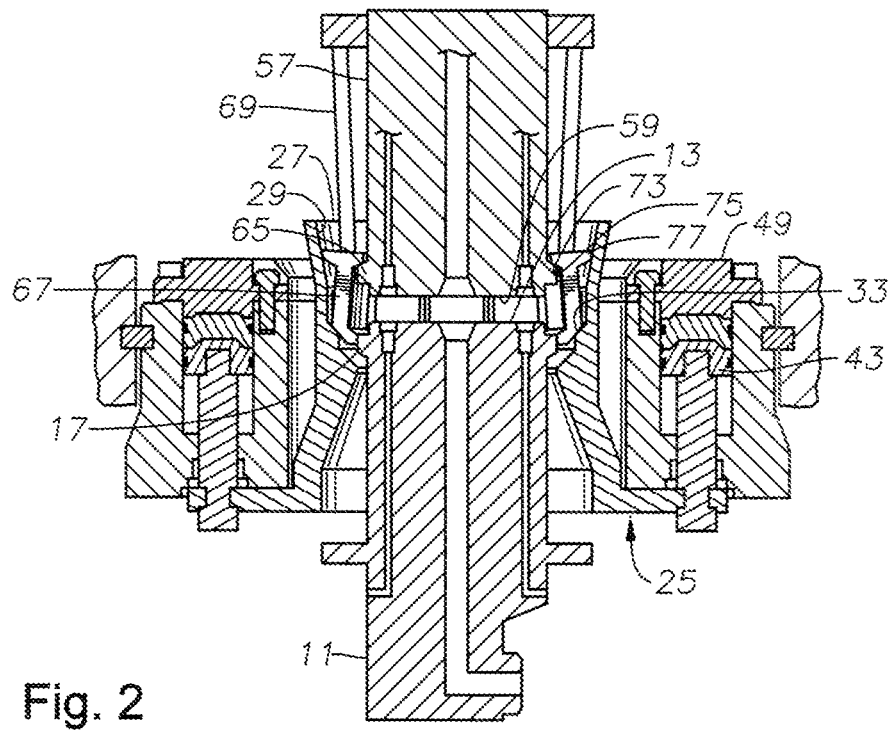
FIG. 2 is a sectional view of the first and second tubular members and connector assembly of FIG. 1, showing a guide basket moved to a forward position.

In the preferred method, the operator then supplies hydraulic fluid pressure to below piston 43, which causes guide basket 25 to move to the upper position, as shown in FIG. 2. In the upper position, guide basket upper end 27 protrudes above housing cap 49. The operator then continues lowering upper tubular member 57, causing dogs 67 to enter guide basket 25. External ribs 77 of dogs 67 engage and slide down conical surface 29, forcing the lower portions of rods 69 to resiliently bend inward. The lower ends of dogs 67 will then land on soft landing shoulder 33, which may momentarily stop descent of upper tubular member 57 before the couplings of auxiliary passages 21, 63 engage each other. Upper tubular lower end 59 will be spaced above lower tubular member upper end 13 at this point. If auxiliary passages 21, 63 (FIG. 1) were not present, soft landing shoulder 33 might be eliminated. Also, guide basket 25 could alternately be moved to the upper position after lower end 59 has landed on upper end 13.

Figure 3:
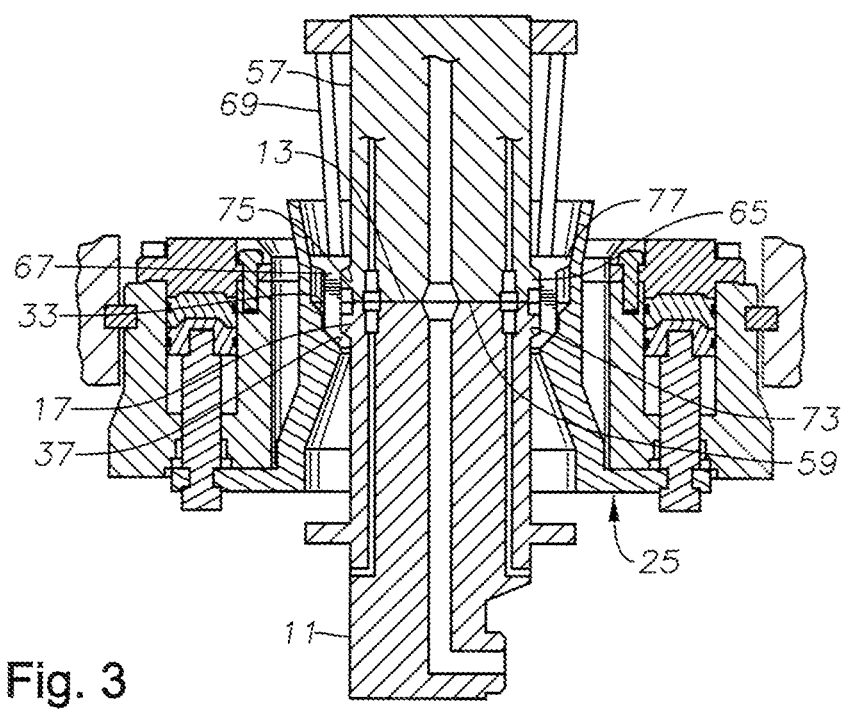
FIG. 3 is a sectional view of the first and second tubular members with the connector assembly in a locked position.

Referring to FIG. 3, applying additional weight to the string supporting upper tubular member 57 will cause the upper tubular member 57 to move farther downward until its lower end 59 abuts lower tubular member upper end 13. The lower ends of rods 69 deflect further inward and dogs 67 will land on back stop shoulder 37. The lower outer sides of dogs 67 will engage cylindrical surface 35, and lower load shoulders 73 will engage the lower side of first flange 17. Upper load shoulders 73 will engage the upper side of second flange 65, locking tubular member flanges 17, 65 together. External rib 77 on each dog 67 engages conical surface 29 of guide basket 25. The engagements of dogs 67 with back stop 37, cylindrical surface 35 and conical surface 29 prevent disengagement of dogs 67 with flanges 17 and 65. A latching mechanism (not shown) may be employed to prevent piston 43 from moving downward if hydraulic pressure is removed.

Figure 4:
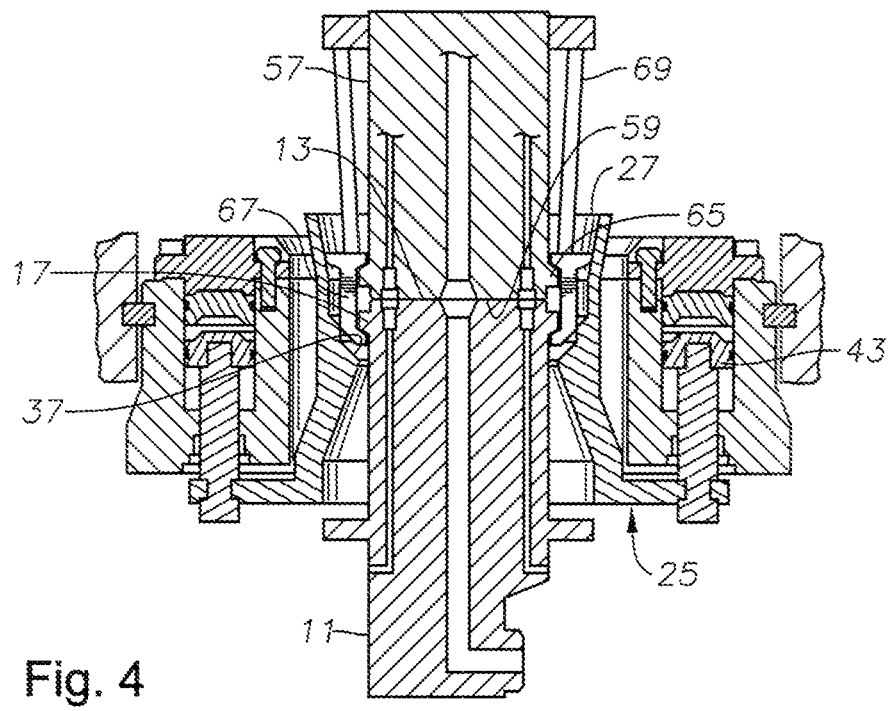
FIG. 4 is a sectional view of the first and second tubular members with the guide basket of the connector assembly beginning to move toward a rearward position.
Figure 5:
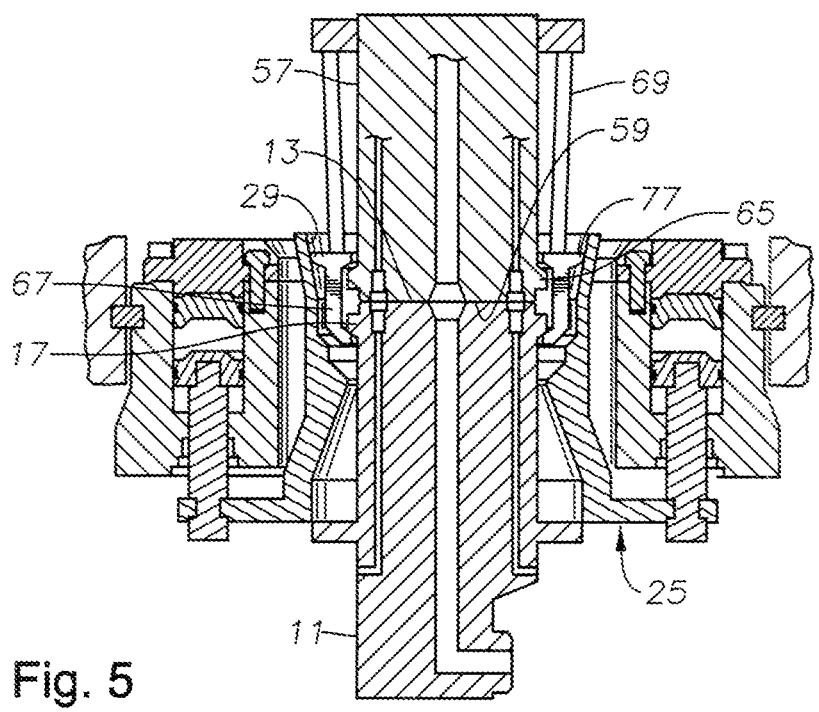
FIG. 5 is a sectional view of the first and second tubular members with the guide basket of the connector assembly moved to the rearward position, which releases the connector assembly.

Referring to FIG. 4, to disconnect, the operator supplies hydraulic fluid pressure to move piston 43 downward, which moves guide basket 25 back toward the lower position. The resiliency of rods 69 causes dogs 67 to move radially outward as guide basket 25 moves toward the lower position of FIG. 5. The operator then simply lifts upper tubular member 57. Once dogs 67 are above guide basket 25, rods 69 will move back to the position of FIG. 1.

Figure 6:
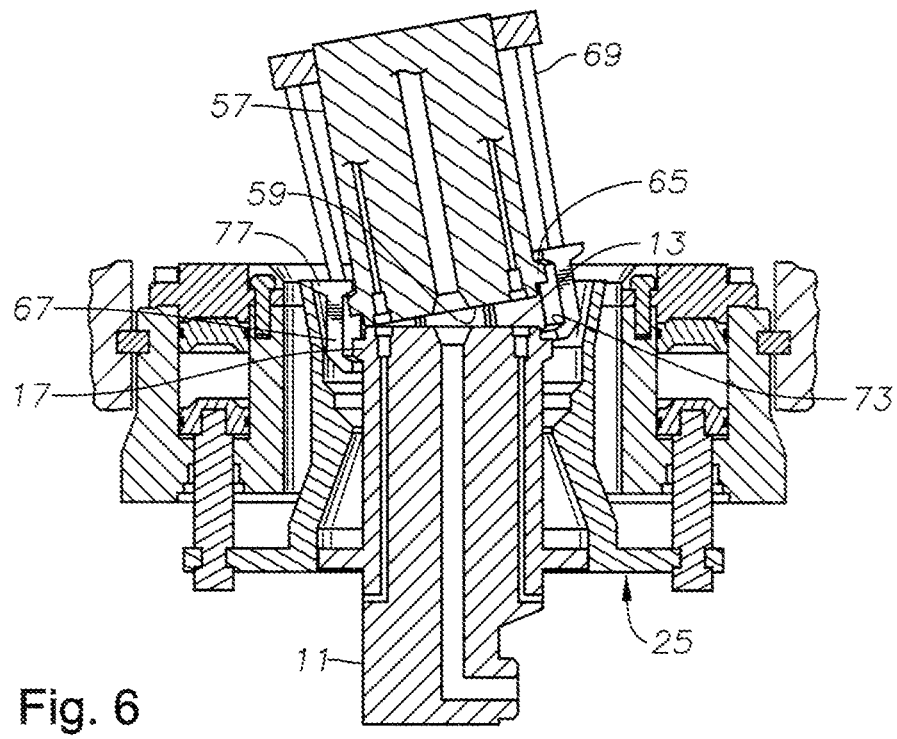
FIG. 6 is a sectional view of the first and second tubular members with the connector assembly released and the second tubular member being removed while at an acute angle relative to the first tubular member.
Figure 7:
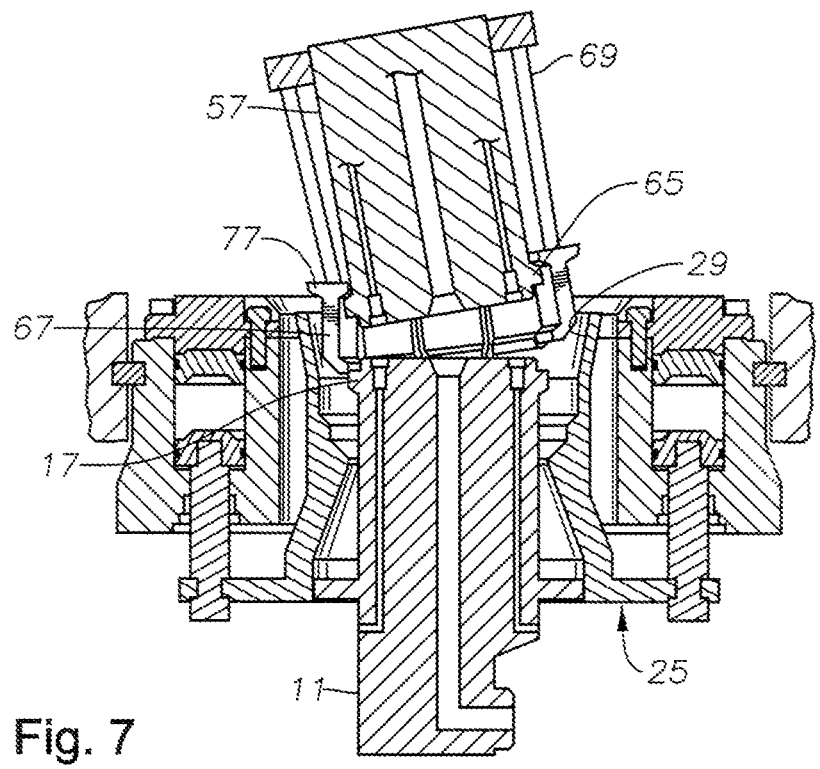
FIG. 7 is a sectional view similar to FIG. 6, but showing the second tubular member farther removed from the first tubular member.

FIGS. 6 and 7 illustrates that disconnection can be made even if upper tubular member 57 is inclined relative to lower tubular member 11 up to 10 degrees or more. The inclination may be due to the vessel at the surface being off position or to strong currents. The inner diameter at guide basket upper end 27 is greater than the outer diameter circumscribed by dog external ribs 77 (FIG. 1). This difference plus the funnel shape of conical surface 29 allows disconnection when out of alignment.

While the disclosure has been shown in only one of its forms, it should be apparent to those skilled in the art that it is not so limited but is susceptible to various changes without departing from the scope of the disclosure.

The invention claimed is:

1. A subsea connector, comprising:
   a first tubular member having an axis and a forward end with an external first flange;
   a guide basket extending around the first tubular member and axially movable along the first tubular member, the guide basket having an open forward end;
   a fluid cylinder assembly that moves the guide basket axially relative to the first tubular member between a rearward position and a forward position;
   a second tubular member having a forward end that abuts the forward end of the first tubular member, the forward end of the second tubular member having an external second flange;
   a plurality of lock dogs carried by the second tubular member, each of the dogs having a first load shoulder for engaging the first flange and a second load shoulder for engaging the second flange and being radially movable relative to the second tubular member;
   wherein while the guide basket is in the forward position, an interior of the guide basket engages outer sides of the dogs to retain the first and second load shoulders of the dogs in engagement with the first and second flanges, respectively; and
   moving the guide basket to the rearward position disengages the interior of the guide basket from the outer sides of the dogs.

2. The connector according to claim 1, wherein the open forward end of the guide basket is forward of the forward end of the second tubular member while the basket is in the rearward and the forward positions.

3. The connector according to claim 1, wherein the interior of the guide basket has a tapered conical surface extending rearward and decreasing in diameter from the open forward end of the basket.

4. The connector according to claim 1, further comprising:
   a tapered soft landing shoulder in the interior forward of a backstop surface, the dogs having forward ends that initially land on the soft landing shoulder as the second tubular member moves toward the first tubular member, the forward ends of dogs then sliding from the soft landing shoulder to the backstop surface as the forward end of the second tubular member abuts the forward end of the first tubular member.

5. The connector according to claim 1, further comprising:
   a lock dog support positioned around the second tubular member, the support having a rearward end fixed to the second tubular member and axially spaced from the second flange;
   wherein the dogs are mounted to a forward end of the support and located within the basket when the forward ends of the first and second tubular members are in abutment with each other; and
   wherein the support is radially flexible and having an initial position wherein the first and second load shoulders of the dogs are spaced radially outward from the first and the second flanges, respectively, and a locked position wherein the basket is in the forward position, the interior of the basket is in engagement with outer sides of the dogs, and the first and second load shoulders of the dogs are in engagement with the first and the second flanges, respectively.

6. The connector according to claim 1, further comprising:
   a plurality of rods spaced around the second tubular member parallel with the axis; and
   wherein each of the dogs is secured to a forward end of one of the rods.

7. The connector according to claim 1, further comprising:
   a plurality of rods spaced around the second tubular member parallel with the axis, each of the rods being resilient and flexible along a length of the rods; and
   wherein each of the dogs is secured to a forward end of one of the rods.

8. A subsea connector, comprising:
   a first tubular member having an axis and a forward end with an external first flange;
   a guide basket extending around the first tubular member and axially movable along the first tubular member, the guide basket having an open forward end and an annular interior back stop surface;
   a fluid cylinder assembly that moves the guide basket axially relative to the first tubular member between a rearward position and a forward position;
   a second tubular member having a forward end that abuts the forward end of the first tubular member, the forward end of the second tubular member having an external second flange;
   a lock dog support positioned around the second tubular member, the support having a rearward end fixed to the second tubular member and axially spaced from the second flange;
   a plurality of dogs mounted to a forward end of the support and located within the guide basket when the forward ends of the first and second tubular members are in abutment with each other, each of the dogs having an first load shoulder for engaging the first flange and a second load shoulder for engaging the second flange; and
   the forward end of the support being radially flexible and having an initial position wherein the first and second load shoulders of the dogs are spaced radially outward from the first and the second flanges, respectively, and a locked position wherein the guide basket is in the forward position, the backstop surface is in engagement with outer sides of the dogs, and the first and second load shoulders of the dogs are in engagement with the first and the second flanges, respectively.

9. The connector according to claim 8, wherein the open forward end of the guide basket is forward of the forward end of the second tubular member while the guide basket is in the rearward and the forward positions.

10. The connector according to claim 8, further comprising a tapered conical surface extending rearward and decreasing in diameter from the open forward end of the guide basket, the back stop surface being rearward from the conical surface.

11. The connector according to claim 8, further comprising:
- a tapered soft landing shoulder joining and forward from the backstop surface, the dogs having forward ends that initially land on the soft landing shoulder as the second tubular member moves toward the first tubular member, the forward ends of the dogs then sliding from the soft landing shoulder to the backstop surface as the forward end of the second tubular member abuts the forward end of the first tubular member.

12. The connector according to claim 8, wherein the backstop surface comprises:
- a tapered backstop shoulder having an outer periphery; and
- a cylindrical surface joining and extending forward from the outer periphery.

13. The connector according to claim 8, wherein the guide basket is free of contact with the first tubular member both in the rearward and forward positions.

14. The connector according to claim 8, wherein the fluid cylinder assembly comprises:
- an annular piston located within a chamber surrounding the guide basket;
- a plurality of shafts extending rearward from the piston and out of the chamber; and
- a frame joining rearward ends of the shafts with a rearward end of the guide basket.

15. The connector according to claim 8, wherein the support comprises:
- a plurality of rods spaced around the second tubular member parallel with the axis, each of the rods being resilient and flexible along a length between the forward and rearward ends of the support, and each of the dogs being secured to one of the rods.

16. The connector according to claim 8; further comprising:
- a conical surface extending rearward and decreasing in diameter from the open forward end of the guide basket; and
- an external rib on each of the dogs radially, outward from the second load shoulder, the ribs sliding on the conical surface as the forward end second tubular member is moved into abutment with the forward end of the first tubular member, the ribs circumscribing a rib outer diameter when the support member is in the located position that is less than an inner diameter of the forward open of the guide basket.

* * * * *